United States Patent [19]

Nakayama

[11] Patent Number: 4,610,565
[45] Date of Patent: Sep. 9, 1986

[54] DEVICE FOR JOINING FRAME MEMBERS FOR PICTURE FRAME

[76] Inventor: Toshikazu Nakayama, No.11-3, Inokashira 1-chome, Mitaka-shi, Tokyo, Japan

[21] Appl. No.: 723,469

[22] Filed: Apr. 15, 1985

[30] Foreign Application Priority Data

Aug. 31, 1984 [JP] Japan ................................ 59-132308

[51] Int. Cl.$^4$ ............................................. F16B 12/50
[52] U.S. Cl. ...................................... 403/402; 40/155
[58] Field of Search ....................... 403/401, 402, 104; 248/188.5, 411; 40/155

[56] References Cited

U.S. PATENT DOCUMENTS

| | | | |
|---|---|---|---|
| 548,498 | 10/1895 | Andren | 248/411 |
| 2,262,939 | 11/1941 | Howard | 248/188.5 |
| 3,453,011 | 7/1969 | Meinunger | 403/104 |
| 4,185,936 | 1/1980 | Takahashi | 248/188.5 X |
| 4,538,936 | 9/1985 | Zeidl | 403/402 |

*Primary Examiner*—Andrew V. Kundrat
*Attorney, Agent, or Firm*—Fleit, Jacobson, Cohn & Price

[57] ABSTRACT

A device for joining frame members of a picture frame of the type comprising a pair of upper and lower frame members, a pair of side frame members and four joint members, each frame member being integrally formed with a laterally extended groove into which are inserted a glass plate and a back plate and a dovetail groove into which is inserted the joint member, characterized in that a ridge is extended at the bottom of each frame member in the longitudinal direction thereof; and handles with cam surfaces for frictional engagement with the dovetail grooves of the frame members are pivotably attached to each joint member.

1 Claim, 7 Drawing Figures

DEVICE FOR JOINING FRAME MEMBERS FOR PICTURE FRAME

BACKGROUND OF THE INVENTION

The present invention relates to a device for joining the corners of the frame members of a picture frame mainly made of a metal or a hard plastic and belongs to International Class A47G1/00.

In the case of a conventional metal or plastic picture frame, as shown in FIGS. 5–7, an elongated frame member is cut into halves each having a predetermined length thereby providing a pair of frame members and the adjacent ends of frame members are interconnected with each other by means of L-Shaped joint members so that a picture frame G as shown in FIG. 5 is provided as is well known in the art. When the ends of the adjacent frame members are joined together, one end of an L-shaped joint member 1 is inserted into one end of an upper frame member 2 while the other end of the L-shaped joint member 1 is inserted to one end of a side frame 3 as shown in FIG. 6 and then the L-shaped joint member 1 is securely joined to the upper and side frames 2 and 3 with a plurality of screws 4, whereby the upper and side frames 2 and 3 are securely joined to each other.

In this case, it is a cumbersome and time consuming operation to tighten a plurality of screws 4 at each corner of the picture frame G. In order to join the upper and side frame members 2 and 3 at right angles relative to each other, the ends of the upper and side frames 2 and 3 must be cut obliquely at predetermined angles. Furthermore in order to make the obliquely cut ends 2a of the upper frame member 2 and the oblique cut ends 3a of the side frame member 3 into intimate contact with each other, the screws 4 must be tightened while the obliquely cut ends 2a and 3a are forcibly pressed against each other. If there results any space between them, the screws 4 must be loosened and re-tightened. As a result, it takes a long time to assemble a picture frame G.

Therefore, the conventional picture frames are considerably unconveninet to those who wish to remove an old picture or the like from a picture frame and put a new picture into it. Furthermore, a screwdriver must be used.

SUMMARY OF THE INVENTION

The present invention was made to overcome the above and other problems encountered in the conventional picture frames.

The present invention therefore provides a device for joining frame members of a picture frame of the type comprising a pair of upper and lower frame members, a pair of side frame members and four joint members, each frame member being integrally formed with a laterally extended groove into which are inserted a glass plate and a back plate and dovetail groove into which is inserted the joint member, characterized in that a ridge is extended at the bottom of each frame member in the longitudinal direction thereof; and handles with cam surfaces for frictional engagement with the dovetail grooves of the frame members are pivotably attached to each joint member.

Therefore according to the present invention the use of screws can be eliminated and the frame members can be joined together only by depressing the handles downwardly. Furthermore, the intimate contact between the ends of the frame members can be automatically attained and maintained. Therefore the assembly of a picture frame can be considerably facilitated and the exchange of a picture to be displayed can be made in a very simple manner.

The above and other objects, effects, features and advantages of the present invention will become more apparent by the following description of a preferred embodiment thereof taken in conjunction with the accompanying drawings.

DESCRIPTION OF THE PREFERRED EMBODIMENT

Figure 1:
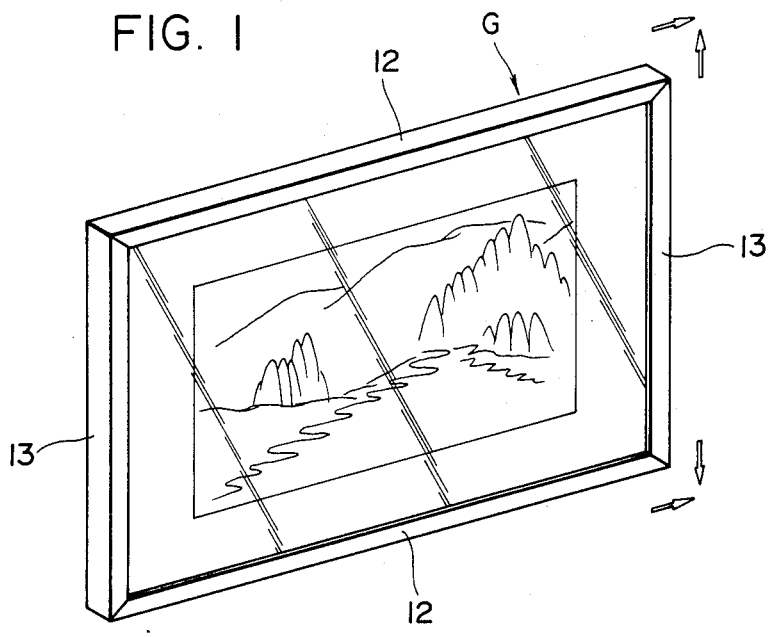
FIG. 1 is a perspective view of a picture frame in accordance with the present invention.

FIGS. 1-4 show a preferred embodiment of a device for joining frame members of a picture frame in accordance with the present invention. An L-shaped joint member 11 is substantially similar in construction to the conventional L-shaped joint members, but has a U-shaped cross sectional configuration and has a ridge 11a. Furthermore, the L-shaped joint member 11 has a pair of handles 15 each of which has its one end pivotably fastened with a pivot pin 16 to the side frames a and b of the L-shaped joint member 11.

The base 15a of the handle 15 is formed with elliptical cam surfaces 16a and 16b and the pivot pin 16 is located on the side of the cam surface 16b.

A picture frame G comprises a pair of upper and lower frame members 12 and a pair of right and left side frame members 13 as shown in FIG. 1. Each of such frame members 12 and 13 is integrally formed with a channel-shaped groove 19 into which are inserted a glass plate 17 and a back plate 18 and a dovetail groove 20 into which is inserted one end of the L-shaped joint member 11. A ridge 20a is extended at the bottom of the dovetail groove 20 in the longitudinal direction thereof and horizontal flanges 20b are extended from the upper sides of the dovetail groove 20 so as to define a longitudinally extended groove 20c between them as best shown in FIG. 2.

An aperture 11b is formed through the bottom of the L-shaped joint member 11 in opposed relationship with the base or lower end of the handle 15.

Next the mode of assembling a picture frame in accordance with the present invention will be described.

Figure 2:
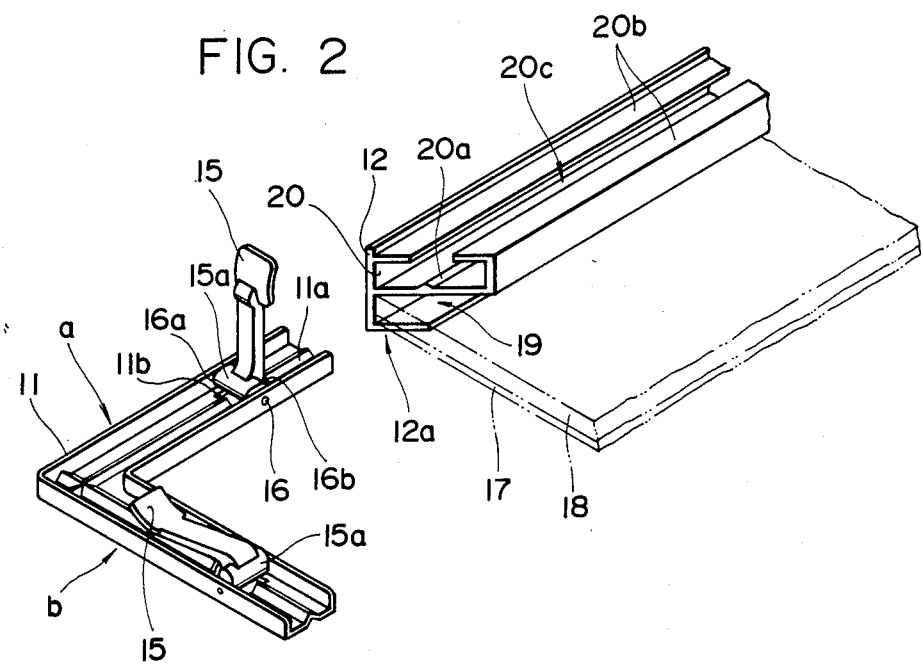
FIG. 2 is a perspective view illustrating a frame member and a joint member immediately before they are joined to each other.

As shown in FIG. 2, one end of the L-shaped joint member 11 is placed in opposed relationship with the obliquely cut end 12a of the upper frame member 11 and is inserted into the dovetail groove 20 with the handle 15 being held upright. Then, the inverted-V-shaped groove at the back of the ridge 11a of the L-shaped joint member 11 is slidably fitted over the ridge 20a in the dovetail groove 20 of the upper frame 12.

Figure 3:
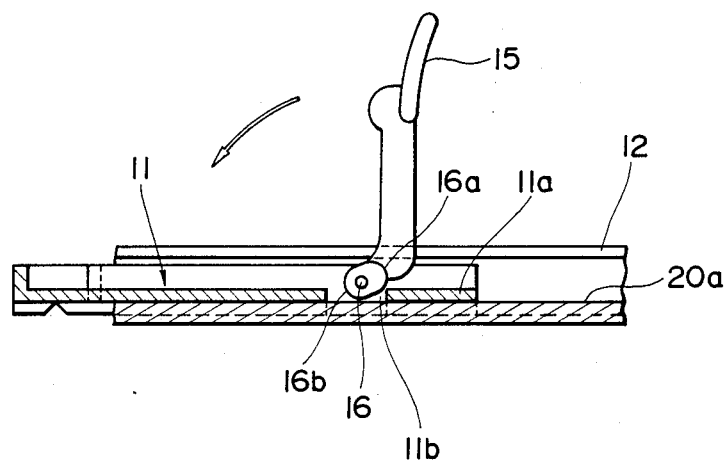
FIG. 3 is a side view, partly in section, illustrating the frame member and the joint member before a handle is depressed downwardly.
Figure 4:
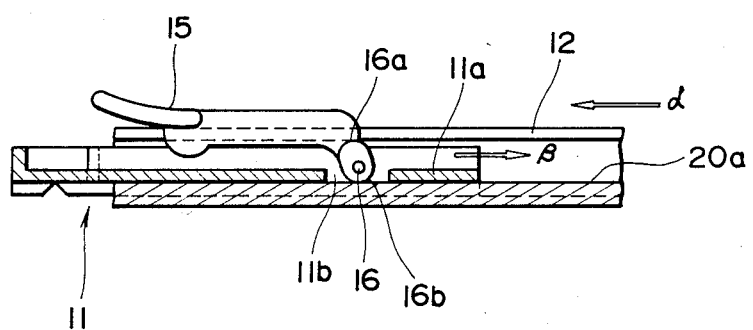
FIG. 4 is a side view, partly in section, illustrating the handle which has been depressed.
Figure 5:
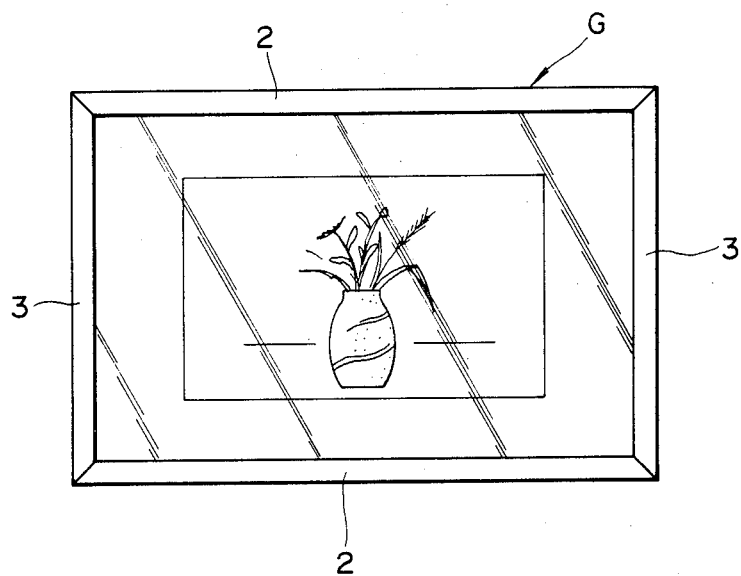
FIG. 5 is a top view of a conventional picture frame.
Figure 6:
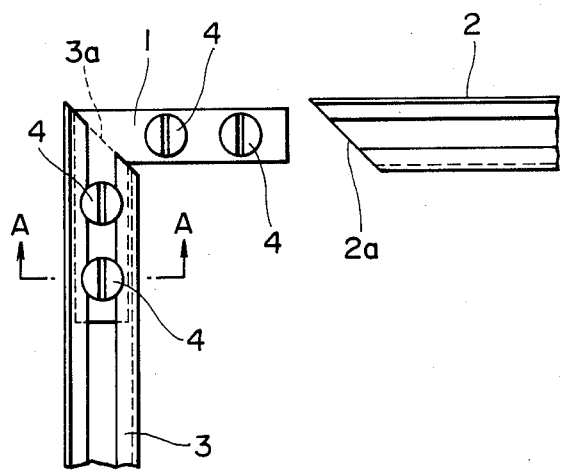
FIG. 6 is a rear view, partly broken away, illustrating the joint between an upper frame member and a side frame member.
Figure 7:
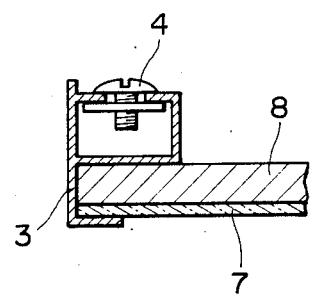
FIG. 7.is a partial sectional view taken along the line A—A of FIG. 6.

After the L-shaped joint member 11 is inserted into the dovetail groove 20 until the bend portion of the L-shaped joint member 11 abuts against the obliquely cut end 12a of the upper frame member 12, the handle 15 is forced to swing downwardly as indicated by an arrow in FIG. 3 about the pivot pin 16. As a result, as shown in FIG. 4, the cam surface 16a is pressed against the undersurfaces of the horizontal flanges 20b of the upper frame member 12 while the cam surface 16b is extended through the aperture 11b and pressed against the ridge 20a of the upper frame member 12. The pivot pin 16 is located on the side of the cam surface 16b and the frictional engagement force between the cam surface 16a and the horizontal flange 20b is greater than the frictional engagement force between the cam surface 16b and the ridge 20a. As a consequence, when the handle 15 is forced to swing downwardly in the manner described above, the displacement force is exerted to the upper frame member 12 in the direction indicated by an arrow α while the displacement force is exerted to the L-shaped joint member 11 in the direction indicated by an arrow β so that the L-shaped joint member 11 is forced into the upper frame member 12 in the direction indicated by the arrow β.

As a result, the L-shaped joint member 11 causes the upper and side frame members 12 and 13 to join at the corner. Therefore, the above-described arrangement is very effective in maintaining an intimate contact between the upper and side frame members 12 and 13 at the corner.

In like manner, the L-shaped joint members 11 are inserted into the upper, lower and side frame members 12 and 13 and then the handles 15 are forced to swing downwardly. Therefore the upper, lower and side frames are joined to each other at their ends so that the picture frame G is assembled.

Furthermore, the forces are exerted to the upper, lower and side frame members 12 and 13 in the directions as indicated by arrows in FIG. 1 so that the ends of the upper, lower and side frame members are firmly pressed against each other and consequently the corners of the picture frame G can be securely joined together.

So far it has been described that the handle 15 is forced to swing downwardly toward the bent portion of the L-shaped joint member 11, but it is to be understood that the handle 15 may be forced to swing downwardly toward the end of the L-shaped joint member 11. When the frictional engagement force between the cam surface 16b and the ridge 20a of the frame member is increased, the same effect can be attained.

As described above, according to the present invention, the use of screws can be eliminated and the upper, lower and side frames can be joined to each other only by forcing the handles to swing downwardly. Furthermore the intimate contact between the ends of the upper, lower and side frame members can be automatically attained and maintained. As a result, the assembly of a picture frame may be much facilitated and the exchange of a picture to be displayed can be accomplished in a very simple manner.

The essential features of the present invention has been described in this specification without restricting the present invention in minor details, materials and proportions other than by the scope of the following claim and various changes and modifications will suggest themselves to those skilled in this art and therefore it is intended that such changes and modifications shall fall within the spirit and scope of the present invention as recited in the following claim.

What is claimed is:

1. A device for joining frame members of a picture frame of the type comprising an upper frame member, a lower frame member, a pair of side frame members and four L-shaped joining members, each frame member being integrally formed with a laterally extended groove and a dovetail groove with a ridge extending longitudinally on the lower surface of said dovetail groove, and each joining member including handles with cam surfaces pivotably attached to said joining member and an inverted groove extending longitudinally on the lower surface of said joining member.

* * * * *